United States Patent
Staunton-Lambert et al.

(10) Patent No.: US 8,032,908 B2
(45) Date of Patent: *Oct. 4, 2011

(54) GRAPHICAL INDICATOR WITHIN AN INTERACTIVE PROGRAM GUIDE

(75) Inventors: Kevin John Staunton-Lambert, Pyrmont (AU); Irvan J. Krantzler, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/704,814

(22) Filed: Feb. 12, 2010

(65) Prior Publication Data

US 2010/0146549 A1 Jun. 10, 2010

Related U.S. Application Data

(63) Continuation of application No. 10/908,878, filed on May 31, 2005, now Pat. No. 7,703,115.

(51) Int. Cl.
*H04N 5/445* (2011.01)
(52) U.S. Cl. .................. 725/40; 725/38; 725/39
(58) Field of Classification Search ................ None
See application file for complete search history.

(56) References Cited

U.S. PATENT DOCUMENTS

| | | | |
|---|---|---|---|
| 5,353,121 A * | 10/1994 | Young et al. ................ 725/52 |
| 5,410,367 A | 4/1995 | Zahavi et al. | |
| 5,585,838 A | 12/1996 | Lawler et al. | |
| 6,347,400 B1 | 2/2002 | Ohkura et al. | |
| 6,421,067 B1 * | 7/2002 | Kamen et al. ............ 715/719 |
| 6,481,011 B1 | 11/2002 | Lemmons | |
| 7,203,952 B2 * | 4/2007 | Broadus ................... 725/40 |
| 7,703,115 B2 | 4/2010 | Stauton-Lambert et al. | |
| 2003/0084445 A1 * | 5/2003 | Pilat ....................... 725/44 |
| 2004/0055007 A1 * | 3/2004 | Allport ..................... 725/39 |
| 2008/0082927 A1 | 4/2008 | Kelts | |

* cited by examiner

*Primary Examiner* — William Trost, IV
*Assistant Examiner* — Oschta Montoya
(74) *Attorney, Agent, or Firm* — Patent Capital Group

(57) ABSTRACT

A system is presented having a graphical indicator in an interface screen of an electronic program guide. The graphical indicator is configured to focus a user's attention on a selectable program instance field. The indicator has a length that depends on the duration of the selectable program instance, thereby conveying the start and stop times of the selectable instance. At least one indicator attribute is controllable by the user. For example, the user may control the indicator height, weight, width or brightness.

11 Claims, 4 Drawing Sheets

GRAPHICAL INDICATOR WITHIN AN INTERACTIVE PROGRAM GUIDE

The present U.S. Application is a continuation of, and claims priority from, U.S. application Ser. No. 10/908,878 entitled "GRAPHICAL INDICATION of SELECTED CELL WITHIN an INTERACTIVE PROGRAM GUIDE", filed on May 31, 2005, naming the same inventors. The above-identified parent application is incorporated herein by reference.

TECHNICAL FIELD

The present invention relates to rendering of user interface screens and, more particularly, relates to providing an electronic program guide for use in a subscription television system where a user is permitted to select programs from the electronic program guide.

BACKGROUND OF THE INVENTION

Subscription television systems typically include an electronic program guide (EPG). With the development of interactive digital set-top boxes (STBs), a new type of advanced multimedia EPG was developed which may be referred to sometimes as interactive program guides (IPGs). Today, the acronyms EPG and IPG have been used interchangeably. The EPG provides an onscreen display of a program grid menu that includes a program lineup and episode information for every channel for the next several days. The program grid menu may be arranged in various ways. The program grid menu itself is a user interface where the user may navigate the program grid menu using arrow keys on a remote. For example, a typical EPG would have a program grid menu based on available channel and time. The user can navigate or scroll through the list of programs within a selected time slot until the desired program is highlighted. The boundaries of other fields associated with the highlighted field may also be highlighted such as the corresponding channel and time. The highlighted field may also sometimes be referred to either as a pill or as being active. Once the desired field is highlighted as a selectable item, the user may select the highlighted field using the select button on the remote.

Typically, a field in the EPG is shown as being highlighted by using a different color background relative to the background of any other field. Alternatively, a selectable field may be depicted as being enlarged or oversized. For the purposes of describing the present invention, the surrounding boundary or edge of the field corresponding with a selectable field is bolded to depict a field being highlighted. Although the present invention illustrates EPGs having a particular configuration or number of fields, today's EPGs include hundreds or even thousands of possibilities which the user may scroll through, highlight and select. Therefore, because of the increasing number of options within an EPG, as well as because of the difficulty some users have determining which item is selectable, there is a need to bring greater attention to the selectable item within the EPG.

DETAILED DESCRIPTION OF EXAMPLE EMBODIMENTS

The present invention will be described more fully hereinafter with reference to the accompanying drawings in which like numerals represent like elements throughout the several figures, and in which an exemplary embodiment of the invention is shown. This invention may, however, be embodied in many different forms and should not be construed as being limited to the embodiments set forth herein; rather, the embodiments are provided so that this disclosure will be thorough and complete, and will fully convey the scope of the invention to those skilled in the art. The present invention is described more fully herein below.

Figure 1:
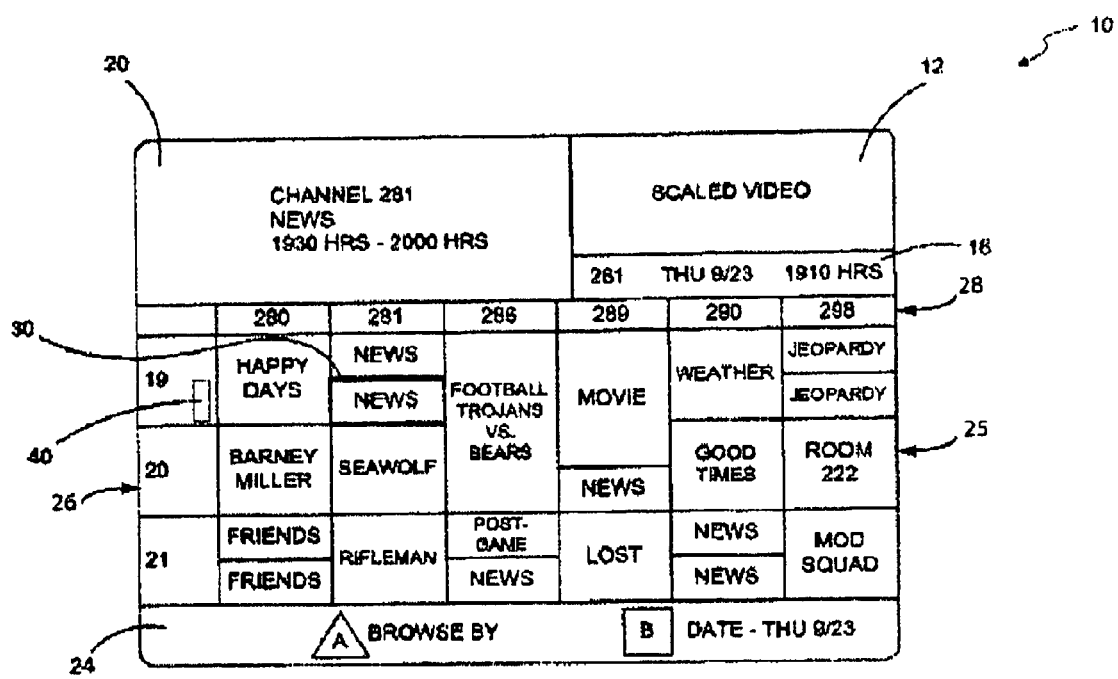
FIG. 1 illustrates a screen-shot of a graphical user interface screen having an instance of a program highlighted as being selectable as well as having an indicator along a vertical time axis corresponding with the selectable instance according to one embodiment of the present invention.

FIG. 1 illustrates a screen-shot of a graphical user interface screen 10 of an EPG according to one embodiment of the present invention. The screen 10 may be presented in response to user input that may be provided via the activation of a guide key on a remote control, for example, the "Guide" key. In the top right of the screen 10, video corresponding to the channel to which a device is currently tuned may be displayed in the video area 12. Immediately below the video area 12 is an information banner 16 for displaying the channel number corresponding to the channel to which the device is currently tuned, the current day and date, and the current time. The method used to indicate time in the present invention is commonly referred to as military time. However, other methods of indicating time may be utilized.

The top left portion of the screen 10 is a detailed focus area 20 may include detailed information for a currently selectable instance of a program. The detailed focus area 20 may include channel number, channel description, presentation name, duration of the presentation, and/or any episode information or rating. The bottom area 24 of the screen 10 also indicates the current day for which presentation listing data is being displayed as well as information about the current functions of the optional "A" and "B" keys that may be on the remote controls and are used in conjunction with the EPG. Further information regarding an interactive program guide can be found in copending U.S. patent application Ser. No. 10/212,017 filed on Aug. 2, 2002, the disclosure and teachings of which are hereby incorporated by reference.

The user interface screen 10 of FIG. 1 includes a grid menu of television program instances in program instance fields 25 that can be identified by time and channel. In FIG. 1, the time corresponding to each of the program instances is provided, in a time portion 26, that is arranged vertically in a column along the left of the grid menu in the example embodiment of FIG. 1. The channel corresponding to each instance is shown in a channel portion 28, depicted as a horizontal row along the top of the grid menu. Each row of fields within the grid menu is scrollable up and down and to the left and right where each scroll highlights a different field. For example, as a user scrolls in time across the grid menu, different program instances corresponding with different program instance fields 25 are highlighted as selectable and information such as the day and date indications displayed in various areas of the screen 10 are updated.

However, as explained above, the television programs may be arranged in any other manner. For example, the user interface screen of an EPG may be configured such that the EPG itself appears to move while a selectable field which is highlighted is maintained at the center of the grid menu. Preferably, the user interface screen 10 is created by utilizing images which may be tiled or stretched as background for drawn text. These background images may be tiled in either horizontal or vertical directions. Those skilled in the art appreciate that any tilable image carries with it information so that the image can morph itself when the image is displayed. For example, in FIG. 1, the user interface screen 10 includes one or more background images and accompanying text which correspond with the horizontal list of channels. One or more other background images may be utilized to correspond with the columns and rows of program instance fields 25 which make up the program grid of television programs. Text is then drawn over these background images to identify each instance of the programs presented from the EPG. Other background images may be utilized elsewhere in the user interface screen 10.

Still referring to FIG. 1, a television program instance titled "News", which corresponds with program channel 281 and has a start time of 1930 Hrs, is identified by reference number 30. The edge of the program instance field having the text for identifying the television program instance 30 is bolded to depict being highlighted as a result of user interaction such as scrolling through the program grid.

The screen 10 of the present invention also includes an indicator 40 according to one embodiment of the invention. The indicator 40 is preferably utilized as part of interactive television such as with an EPG/IPG to indicate position, start and end times, and/or duration of a selectable instance of a program. In FIG. 1, the indicator 40 corresponds with the position in the grid menu of the highlighted and selectable television program instance 30 titled "News". However, the indicator 40 may be utilized elsewhere as part of any graphical user interface that may be implemented as part of, for example, video games, interactive course ware, PDA's, cell phones, etc.

In one embodiment, the indicator 40 may be, but is not limited to, one or more graphic elements, separate or in combination with one another, which could be a graphic primitive such as a rectangle or oval or a complex image format such as GIF, JPEG, PNG or others, which may be configured in any number of ways. Preferably, the indicator 40 is variably sized depending on the attributes of the corresponding selectable program instance. Because of the variable size of the indicators of the present invention, the indicators of the present invention may be referred to as thermometers that measure the position, start and end times, and/or duration of a selectable program instance.

Figure 2:
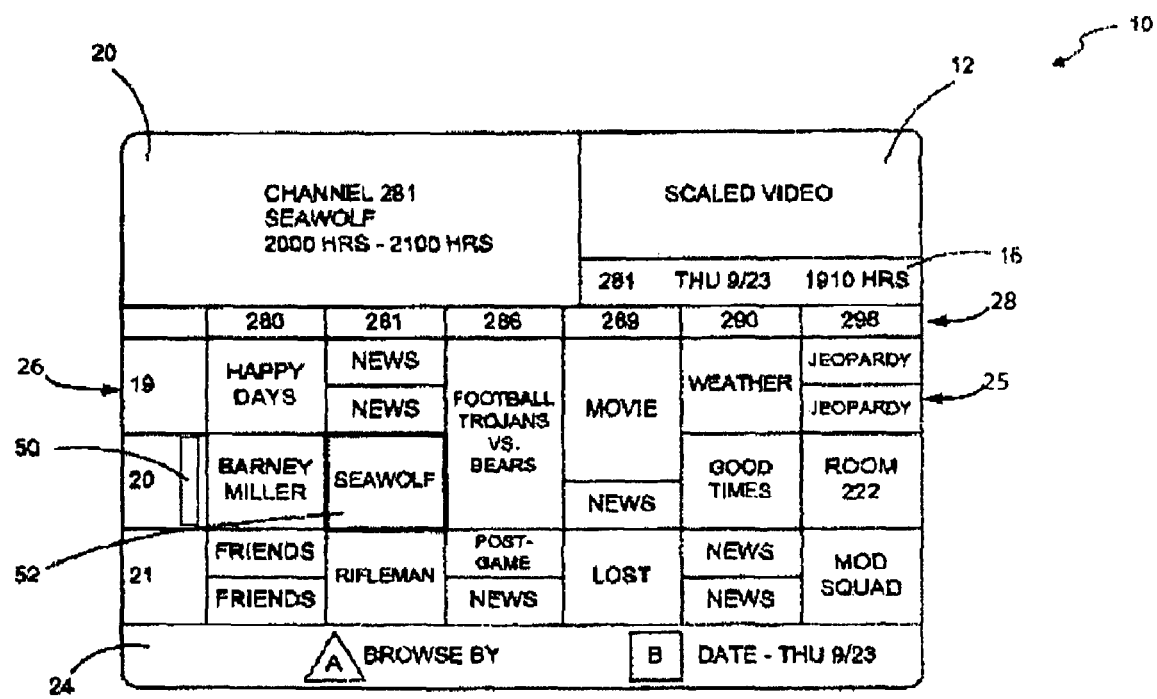
FIG. 2 illustrates the graphical user interface screen of FIG. 1 with a different highlighted instance and corresponding indicator.
Figure 3:
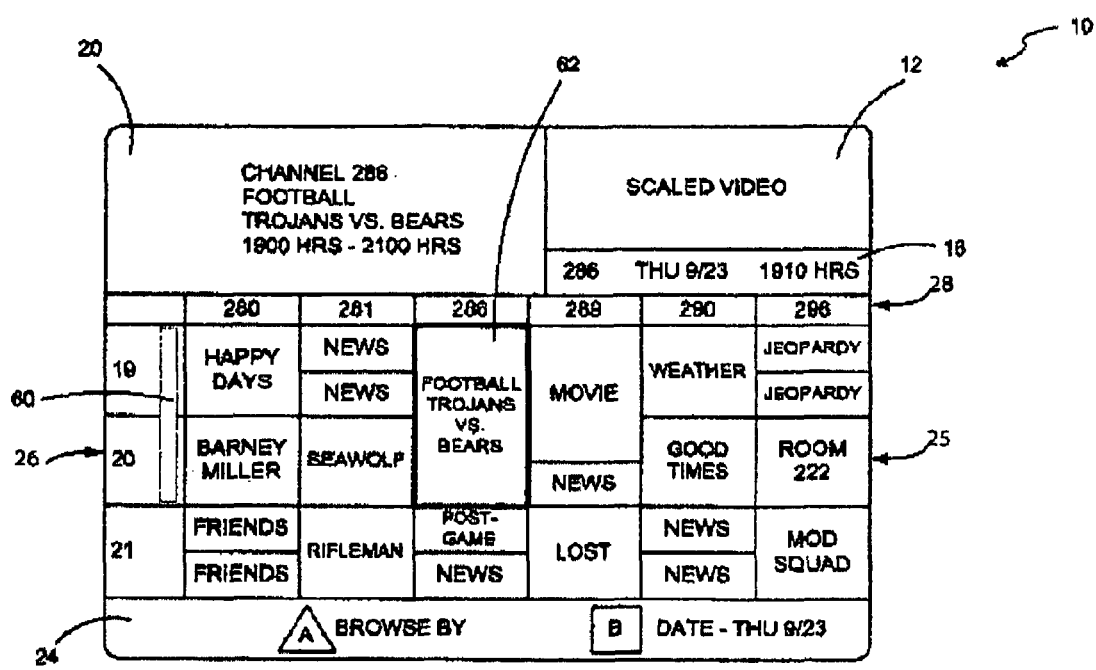
FIG. 3 illustrates the graphical user interface screen of FIG. 1 with yet another different highlighted instance and corresponding indicator.

In FIGS. 1-3, the indicators 40, 50, 60 depicted as being part of the vertical column indicating time in the gird menu, time portion 26, and are, therefore, elongated in the vertical direction. Preferably, the indicator does not appear to fill the entire field of a time period. For example, the width of the indicator does not extend over the rest of the tile behind the text identifying the channel number of the program instance 30.

Indicators of the present invention may also indicate the start time as well as the duration of a program instance. Still referring to FIG. 1, one of the ends the indicator 40 corresponds with the start time of the corresponding selectable program instance 30, which is 1930 Hours, and the other end of the indicator 40 corresponds with the end time of the corresponding selectable program instance 30, which is 2000 Hours. Therefore, the indicator 40 not only conveys position, the length of the indicator 40 corresponds with the duration of the selectable program instance 30 which, in this example, is a half an hour long.

FIG. 2 illustrates an indicator 50 according to another embodiment of the present invention. In FIG. 2, the user has scrolled down in the grid menu of the screen 10 to a later time compared to the time of the selectable program instance 30 shown in FIG. 1 Indicator 50 corresponds with the program instance 52 which is shown to be a full hour in duration because one end of the indicator 50 corresponds with the start time of the corresponding selectable program instance 52, which is 2000 Hours, and the other end of the indicator 50 corresponds with the end time of the corresponding selectable program instance 52, which is 2100 Hours.

FIG. 3 illustrates an indicator 60 according to another embodiment of the present invention. In FIG. 3, the user has scrolled to the right in the grid menu of the screen 10 to a different channel than the channel of either of the selectable program instances 30, 50 of FIGS. 1 and 2. Indicator 60 corresponds with the program instance 62 which is shown to be two hours in length. One end of the indicator 60 corresponds with the start time of the selectable program instance 62, which is 1900 Hours, and the other end of the indicator 60 corresponds with the end tine of the selectable program instance 62, which is 2100 Hours.

Figure 4:
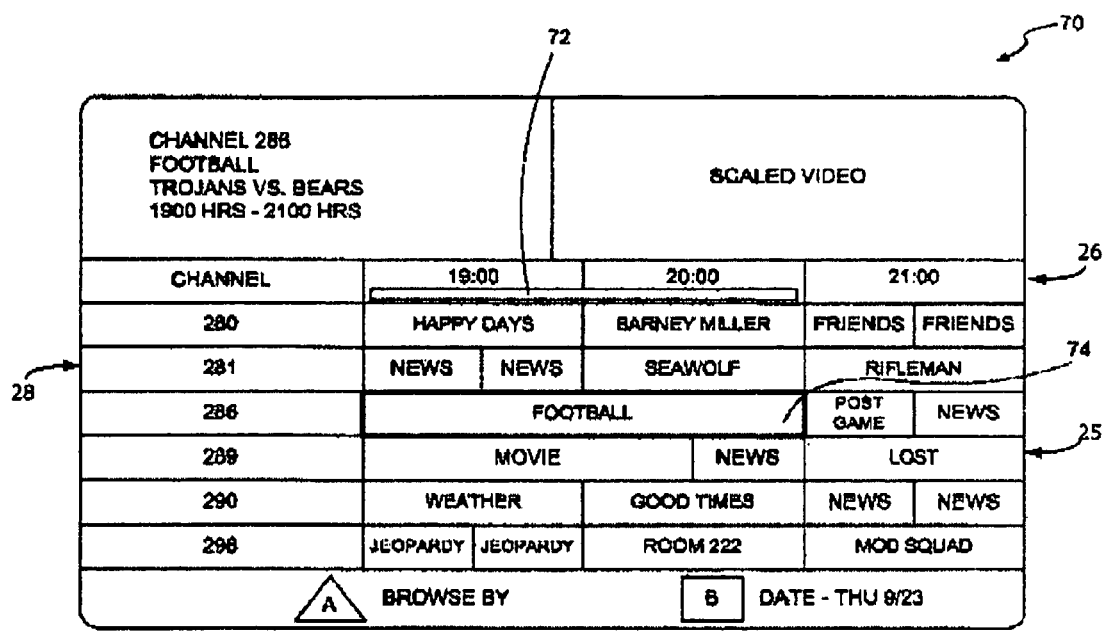
FIG. 4 illustrates a screen-shot of an alternative graphical user interface having an indicator along a horizontal time line according to another embodiment of the present invention.

FIG. 4 illustrates a screen-shot of an alternative graphical user interface screen 70 of an EPG according to another embodiment of the present invention. As does screen 10 described above in regard to FIGS. 1-3, screen 70 includes a grid menu of television program instances identified by time and channel. However, the screen 70 is distinguishable from screen 10 because in FIG. 4 the channels corresponding to each of the program instances are arranged vertically in a column along the left of the grid menu and the time corresponding to each instance is shown in a horizontal row along the top of the grid menu.

In FIG. 4, an indicator 72 corresponds with the position in the grid menu of a highlighted and selectable television program instance 74 which is in the same time slot of the same program as program instance 62 is in FIG. 3. However, because time and channel in FIG. 4 is inverted to the time and channel of FIG. 3, the indicator 72 is horizontally oriented rather than vertically oriented. One end of the indicator 72 corresponds with the start time of the selectable program instance 74, which is 1900 Hours, and the other end of the indicator 72 corresponds with the end time of the selectable program instance 74, which is 2100 Hours.

In some embodiments, the attributes of the indicators of the present invention may be controlled by the user. For example, the colors of the indicators of the present invention may also be varied based upon the genre of the highlighted selectable program instance or be determined by user controlled preferences. The user may also control other attributes of the indicator, for example, such as the height, width, invisibility, brightness, or whether the indicator is on or off. Also, the indicators of the present invention may be intermittently displayed to the user. For example, the indicator may be made to appear to blink to gain the users attention to then help the user find the currently selectable field. In another embodiment, the indicator may no longer blink when the user is no longer scrolling and after a particular program instance has been highlighted for a particular period of time. In another embodiment, the rate at which the indicator blinks can be varied depending upon the length of time a particular program instance is highlighted. The rate at which the indicator blinks may also be based upon the duration of the currently selectable program. For example, program instances which are shorter in duration may have corresponding indicators which blink more frequently to gain the users attention than do program instances which are longer in duration.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

We claim:

1. A system comprising:
    a user interface screen comprising:
        a plurality of program instances arranged by time and channel in a grid menu, said grid menu composed of a time portion for listing time periods, a channel portion for listing channels, and program instance fields for identifying program instances, each said program instance being selectable based upon user interaction; and
        at least one indicator depicted in association with one of said program instances when said one program instance becomes highlighted and selectable as a result of said user interaction, said indicator corresponding with the position in said grid menu of said highlighted and selectable program instance and indicating a start time and an end time of said selectable program instance, said indicator having a length that depends on the duration of said one selectable program instance, with a first end corresponding with a start time of said one selectable program instance, and a second end corresponding with an end time of said one selectable program instance wherein at least one attribute of said indicator is controllable by said user, said at least one attribute belonging to a group consisting of height, and width, and brightness, and wherein the indicator is configured to stop blinking after said one selectable program instance has been highlighted for a particular period of time, wherein said indicator blinks at a rate depending upon a period of time that said one selectable program instance is highlighted.

2. The system of claim 1 wherein whether said indicator is on or off is controllable by said user.

3. The system of claim 1 wherein said indicator conveys a genre of said one selectable program instance.

4. The system of claim 1 wherein said indicator is displayed intermittently.

5. The system of claim 1, wherein said indicator blinks at a rate based upon a duration of said one selectable program instance.

6. The system of claim 5 wherein said one program instance which is shorter in duration corresponds with said indicator which blinks more frequently to gain the user's attention than when said indicator corresponds with another said program instance which is longer in duration.

7. The system of claim 1 wherein said indicator is substantially vertically oriented.

8. The system of claim 1 wherein said indicator is substantially horizontally oriented.

9. The system of claim 1 wherein said user interface screen is utilized as part of an electronic program guide.

10. The system of claim 1, wherein the brightness of said indicator is controllable by said user.

11. An apparatus, comprising:
    a user interface screen comprising:
        a plurality of program instances arranged by time and channel in a grid menu, said grid menu composed of a time portion for listing time periods, a channel portion for listing channels, and program instance fields for identifying program instances, each said program instance being selectable based upon user interaction; and
        at least one indicator depicted in association with one of said program instances when said one program instance becomes selectable as a result of said user interaction, said indicator corresponding with the position in said grid menu of said highlighted and selectable program instance and indicating a start time and an end time of said selectable program instance, said indicator having a length that depends on the duration of said one selectable program instance, with a first end corresponding with a start time of said one selectable program instance, and a second end corresponding with an end time of said one selectable program instance, wherein at least one attribute of said indicator is controllable by said user, said at least one attribute belonging to a group consisting of height and width, and wherein the indicator is configured to stop blinking after said one selectable program instance has been highlighted for a particular period of time, and wherein the brightness of said indicator is controllable by said user, wherein the indicator blinks at a rate based upon a duration of the one selectable program instance.

* * * * *